United States Patent [19]

Boldt

[11] Patent Number: 5,510,152

[45] Date of Patent: Apr. 23, 1996

[54] PROCESS FOR CURING A GASKET COATING

[75] Inventor: Brent R. Boldt, Rolling Meadows, Ill.

[73] Assignee: Dana Corporation, Toledo, Ohio

[21] Appl. No.: 343,691

[22] Filed: Nov. 22, 1994

Related U.S. Application Data

[62] Division of Ser. No. 97,987, Jul. 27, 1993, which is a continuation of Ser. No. 867,887, Apr. 13, 1992, abandoned.

[51] Int. Cl.⁶ ...................................................... C08J 7/04
[52] U.S. Cl. ...................... 427/510; 427/256; 427/385.5; 427/558; 427/559
[58] Field of Search ................................... 427/510, 558, 427/559, 256, 385.5

[56] References Cited

U.S. PATENT DOCUMENTS

| | | | |
|---|---|---|---|
| 4,004,997 | 1/1977 | Tsukamoto et al. | 522/81 |
| 4,145,509 | 3/1979 | Bhatia | 528/50 |
| 4,382,135 | 5/1983 | Sinka et al. | 522/96 |
| 4,557,813 | 12/1985 | Heil et al. | 522/96 |
| 4,560,456 | 12/1985 | Heil et al. | 522/96 |
| 4,635,947 | 1/1987 | Hatayama | 277/235 A |
| 4,721,734 | 1/1988 | Gehlhaus et al. | 522/8 |
| 4,763,312 | 8/1988 | Tokunaga et al. | 522/6 |

*Primary Examiner*—Bernard Pianalto
*Attorney, Agent, or Firm*—Dykema Gossett

[57] ABSTRACT

A formulation for a resilient gasket coating which is curable by ultraviolet radiation without emitting fumes into the surrounding environment. Different portions of the coating are cured by successive exposure to two different wavelengths of ultraviolet radiation during a continuous in-line process. The first wavelength cures an inner portion of the coating and bonds the coating to the substrate. The second wavelength cures a coating surface. The formulation permits ultraviolet curing of thicker pigmented coatings than have been previously known.

9 Claims, 1 Drawing Sheet

PROCESS FOR CURING A GASKET COATING

This is a divisional of application(s) Ser. No. 08/097,987 filed on Jul. 27, 1993, which is a continuation of Ser. No. 07/867,887 filed on Apr. 13, 1992, abandoned.

BACKGROUND OF THE INVENTION

The invention relates in general to gaskets for providing a seal between two mating components and in particular to an improved formula for a curable coating applied to gaskets for sealing purposes and an improved method for curing the coating.

Gaskets are well known articles which are adapted to provide a leak-proof seal between two mating components. Typically, the two components are formed having mating surfaces which are disposed adjacent to one another during use. During assembly of the components, a gasket is placed between the mating surfaces. Such gaskets are typically formed having a plurality of ports or openings for accommodating the passage of various gases and fluids between the joined components. Bolts or similar means are utilized to connect the two components together and compress the gasket between the mating surfaces. When compressed in this manner the gasket effects a relatively leak-proof seal between the two components.

In order to enhance the seal, rigid gaskets are frequently coated with a resilient material. The resilient material may be applied to the gasket to form a covering layer, or it may be formed in beads surrounding the various openings formed through the gasket and along the perimeter of the gasket itself. As the bolts are tightened, the gasket and the resilient material are compressed between the mating parts. Such compression initially causes the resilient material to be compressed into the gasket material to form a seal between the parts being joined. Further compression causes the remainder of the gasket to be compressed between the pans. Thus, a tight sea is formed between the mating parts.

Typically, the resilient material is applied to both sides of the gasket, but it may be on only one side. A compressible elastomeric material, such as a nitrile epoxy copolymer or a silicone polymer, is often used for the coating. A number of processes exist for applying the resilient material to the gasket, including silk screening and printing. Often, a solvent is added to the resilient material to reduce its viscosity as an aid in the application process.

Once the resilient material is applied to the gasket, the coated gasket is cured to solidify the material. Curing also optimizes the physical and chemical properties of the coating as well as assuring adhesion of the coating to the gasket core. Curing is usually accomplished by heating the coated gasket in an oven. The heating, in addition to chemically curing the coating, causes the solvent to evaporate, thereby releasing solvent fumes into the environment. Certain types of gasket coatings can also be cured by exposure to other forms of radiant energy, such as ultraviolet light waves.

SUMMARY OF THE INVENTION

The invention relates to an improved formula for a coating applied to a gasket for sealing purposes which is cured by a continuous in-line two step process. The coating is formulated for curing by exposure to ultraviolet radiation. The curing process exposes the gasket successively to two different ultraviolet wavelengths. Curing occurs without emission of solvent fumes and is effective when the formula includes pigment. The pigmented formulation can be used to form coatings curable by ultraviolet light which have a greater thickness than previously possible.

The composition of the coating includes one or more acrylic oligomers as a base component. Acrylate monomers are mixed with the oligomer as reactive diluents to enhance application of the coating to a gasket body and to increase flexibility of the coating. The acrylate monomers are either monofunctional or trifunctional. Either a blend of two photoinitiators or a single photoinitiator is included as a catalyst for the ultraviolet radiation curing process. A wetting agent releases trapped air during application of the coating and improves the rheology of the coating. Also, iron oxides are included so that the coating is visible during application and use. The components are essentially 100 percent reactive, with the possible exception of the polydimethylsiloxane and the iron oxide. Because of this, no fumes are released into the environment during curing.

The preferred formulation forms a coating having a improved physical characteristics over prior art coatings. In addition, the mixture has a very slow polymerization time until exposed to ultraviolet radiation. Thus, the formulation has a significantly longer storage life prior to being applied to a gasket than many prior art gasket compositions.

The formulation requires a continuous two step in-line curing process. The first curing step includes exposure to a first ultraviolet radiation source having a relatively long wavelength which cures the inner portions of the coating and bonds the coating to the gasket body. The second step includes subsequent exposure to a second ultraviolet source having a shorter wavelength than the first source for curing the surface portion of the coating. For the preferred formulation, a one second exposure to each source is needed for curing. Thus, total cure time and energy consumption is substantially reduced from prior art processes. The ultraviolet radiation is effective for curing the coating when pigment is included in the formulation. Furthermore, significantly thicker pigmented coatings can be cured with ultraviolet radiation than has been previously possible with other coating compositions.

DETAILED DESCRIPTION OF THE PREFERRED EMBODIMENT

Figure 1:
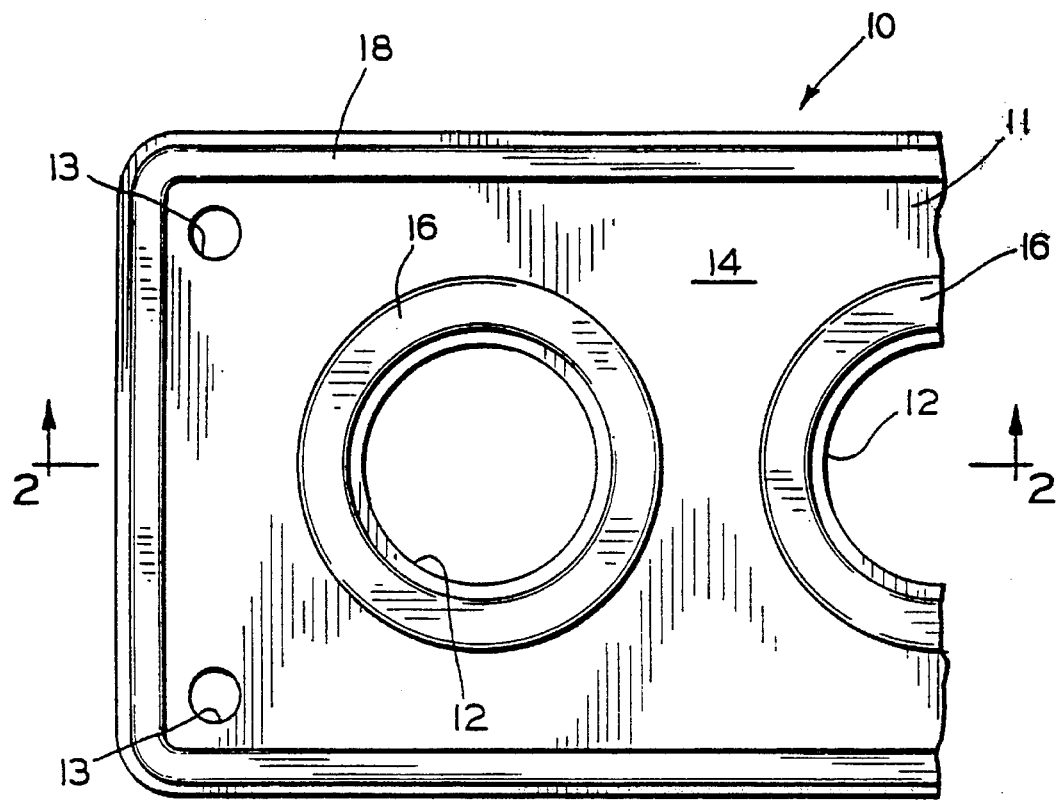
FIG. 1 is a fragmentary plan view of a gasket having a coating according to the invention.

Referring now to the drawings, there is illustrated in FIG. 1 a portion of a gasket, indicated generally at 10, in accordance with the invention. The gasket 10 includes a body 11 which is formed from a material appropriate for the intended use for the gasket. For example, the body 11 may be stamped from a sheet of paper or paper-like material for use in connection with a water pump or similar soft gasket application. Alternatively, the gasket body 11 may be formed from a metal core having facings mechanically clinched thereto, as is known in the art. The gasket body 11 has a plurality of relatively large openings 12 formed therethrough. These openings 12 are sized and located to align with openings between components which are connected together at the gasket 10. The gasket body 11 further has a plurality of relatively small apertures 13 to accommodate the passage of bolts or similar means for connecting the components together.

Figure 2:
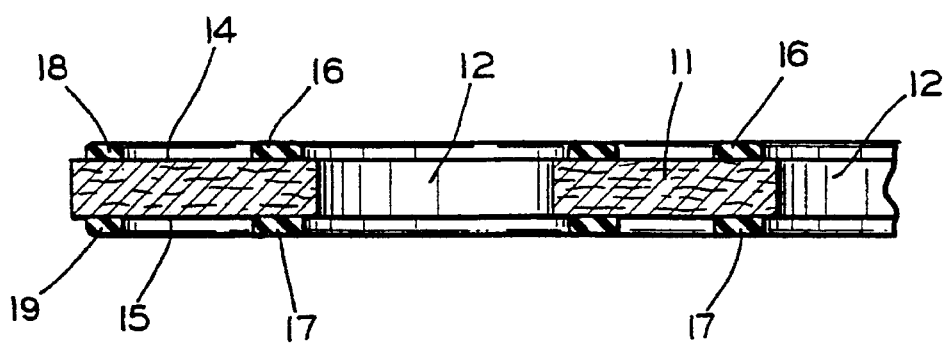
FIG. 2 is a cross-sectional view take along line 2—2 in FIG. 1.

As best shown in FIG. 2, the gasket body 11 is generally flat and includes an upper surface 14 and a lower surface 15. Annular sealing beads 16 and 17 are applied respectively to the upper and lower surfaces 14 and 15 of the gasket body 11 to extend about the openings 12 and other areas of the gasket 10 to enhance the sealing thereof. The sealing beads 16 and 17 are formed of a compressible resilient material. Sealing beads 18 and 19 also extend about the perimeter of the upper and lower surfaces 14 and 15 of the gasket body 11.

As an alternative to sealing beads, the resilient material can be applied to the upper and lower surfaces 14 and 15 of the gasket body 11 as a continuous layer (not shown) to form a covering over both surfaces. The latter approach is often used on small gaskets. In the following description, both sealing beads and complete covering layers are referred to as gasket coatings. Any one of a number of conventional means can be used to apply the resilient material to the desired locations of the gasket body 11, such as silk screening.

The present invention relates to an improved formula for the resilient material forming the gasket coating. The resilient material is a mixture which includes from 50 to 100 parts of aromatic urethane acrylic oligomer as a first major component. The term parts as used above and in the following is similar to the term parts per hundred rubber but refers to parts per hundred oligomer. If more than one oligomer is present in a specific formulation, the sum of the individual oligomer parts total 100. The preferred aromatic urethane acrylic oligomer is supplied by Radcure Specialties of Louisville, Ky. and has a Material Code of RSX 89359. This oligomer replaces nitrile epoxy copolymer and silicone polymer, which are used in prior art coatings, while duplicating their sealing capabilities.

The mixture may also include from zero to 20 parts of aliphatic urethane acrylic oligomer or from zero to 20 parts of epoxyl nitrile acrylic oligomer. These oligomers are also supplied by Radcure Specialties and have respective Material Codes of 8400 and RSX92576,3604. The two oligomers enhance gasket sealing by improving the coating flexibility and resistance to fluids. From zero to 30 parts of nitrile acrylic oligomer may be added to further increase fluid resistance. The nitrile acrylic oligomer is supplied by B. F. Goodrich of Cleveland, Ohio and has a Material Code of HYCAR 130X43. The oligomers are typically heated to approximately 160° F. (71° C.) to lower their viscosity while the other components are added to the mixture.

The mixture further includes from 30 to 55 parts of isobornyl acrylate monomer as a diluent which constitutes a second major component of the mixture. This monomer is supplied by Radcure Specialties under the Material Code of IBOA. The monomer decreases the viscosity of the material to enhance the printing or silk-screening process used to apply the coating to the gasket body 11. Once the monomer is mixed with the oligomer, heating is no longer needed to improve the mixture flow characteristics. The monomer replaces the solvent used in the prior art coatings. Moreover, the monomer is 100 percent reactive and completely combines with the oligomer upon exposure to ultraviolet radiation to form the resilient coating. Because the monomer is completely combined with the oligomer, there are no fumes emitted into the environment during polymerization. Polymerization of the coating is accelerated by inclusion of from one to six parts of trimethylolpropane ethoxy triacrylate monomer. This monomer has a trifunctional chemical structure and is available from Radcure Specialties under the product name of TMPEOTA.

The mixture can further include from zero to 20 parts of octyl decyl acrylate monomer, which is available from Radcure Specialties as ODA. From zero to 20 parts of 2-phenoxyethyl acrylate monomer supplied by Sartomer Co., Inc. of Exton, Pa. under the product name of SR339 can also be included in the mixture. These monomers are reactive diluents added to increase the softness of the coating and completely combine with the oligomer during polymerization.

The mixture includes from three to ten parts of a photoinitiator which functions as an ultraviolet curing catalyst. The catalyst absorbs ultraviolet radiation during curing to induce rapid polymerization of the components to form the resilient coating. The formulation includes a blend of from 0.5 to 2.0 parts of benzophenone and from 2.5 to 8.0 parts of 1-phenyl-2-hydroxy-2-methyl-1-propanone in the final mixture. The benzophenone is available from Sartomer Co., Inc. under the name of BENZOPHENONE and the propanone is supplied by EM Industries, Inc. of Hawthane, N.Y. under the name of DAROCUR 1173. As an alternate catalyst, alpha, alpha-dimethoxy-alpha-phenylacetophenone, which is available from the Ciba-Geigy Corp. of Hawthane, N.Y. as IRGACUPE 65, can be used.

From 0.5 to 2.0 parts of polydimethylsiloxane is included as a wetting agent to assure release of any air trapped in the mixture and improve the rheology of the coating. The polydimethylsiloxane can be obtained from Union Carbide Corp. of Danbury, Connecticut as SAG 47.

Preferably the mixture further includes from 0.01 to 0.06 parts of iron oxide magnetite, $Fe_3O_4$, as a first pigment and/or from 0.2 to 0.6 parts of iron (III) oxide, $Fe_2O_3$, as a second pigment. These pigments add color and visibility to the coating. In prior art mixtures, pigmentation often interfered with an ultraviolet curing process since the pigment would block the ultraviolet radiation. With the present formulation, curing occurs even with pigment present.

Coatings formed with this formulation provide enhanced sealing characteristics over prior art coatings, as will be illustrated below. The coating formed with the preferred formulation displays excellent adhesion to the gasket body or substrate and excellent surface cure. A coating formed with the new formulation was tested by a 70 hour immersion in a boiling fluid. Throughout the immersion, chemical integrity and substrate adhesion were maintained.

It has been found that most coatings formed from the formulation cure within one to four seconds. In any event, all coating compositions can be cured in less than 20 seconds. This is a very short curing time and represents a significant reduction from curing times of several minutes for the curing of prior art coatings in heated ovens. The to reduction in curing time increases productivity with a lowering of unit costs. In addition, because of the speed of curing and the nature of the ultraviolet radiation, the gasket body 11 reaches temperatures lower than would occur in typical heat cured systems. Typically, temperatures do not exceed 160° F. (71° C.). The low curing temperatures allow use of heat sensitive material for the gasket body 11. It is not necessary to preheat the gasket body 11 to remove volatiles before applying the coating. No solvent fumes are released to the environment during curing, as compared to prior art gasket coatings which release fumes during curing.

Previous polymer coatings would begin a rapid polymerization upon being mixed. Consequently, the mixed coatings had a short shelf life. It has been found that the present invention reacts slowly in the absence of ultraviolet light, giving the mixture a substantially longer storage life prior to being applied to a gasket.

The following examples are presented solely for the purpose of further illustrating and disclosing the invention.

They are to be construed as illustrative, and not as limiting. Example 5 constitutes the best mode presently contemplated by the inventor. In the examples, as explained above, the term Parts represents Parts per Hundred Oligomer.

The physical properties of coatings formed from the example formulations are compared to the properties of a coating formed from a prior art formulation, Victocote 960. Victocote 960 is manufactured by Victor Products of Lisle, Ill. A coating formed from Victocote 960 has a tensile strength of 1200 PSI (84.37 Kg per cm$^2$), elongation of 80 percent, and hardness, as measured with a standard bench type Shore A Hardness Tester of 80.

EXAMPLE 1

| Component | Parts by Weight | Weight Percent |
| --- | --- | --- |
| Aromatic Urethane Acrylic Oligomer | 100.0 | 62.54 |
| Isobornyl Acrylate Monomer | 50.67 | 31.69 |
| Alpha, Alpha-Dimethoxy-Alpha-Phenylacetophenone | 6.67 | 4.16 |
| Polydimethylsiloxane | 2.00 | 1.25 |
| Iron Oxide Magnetite | 0.05 | 0.03 |
| Iron (III) Oxide | 0.52 | 0.33 |
| | 159.91 | 100.00 |

The composition was cured by exposure to an ultraviolet lamp having a nominal wavelength of 425 nanometers and a wavelength range between 385 and 460 nanometers for 0.75 second followed by exposure to a second lamp having a nominal wavelength of 375 nanometers and a wavelength range between 340 and 410 nanometers for 0.75 second. The first curing step utilizes a relatively long wavelength ultraviolet light that has the ability to penetrate to the coating/substrate interface before the top surface is fully cured. The penetration to the substrate interface by the longer wavelength ultraviolet light effectively achieves excellent substrate adhesion. The second curing step exposes the surface to a shorter wavelength ultraviolet light thereby achieving a tack-free surface cure without the need for an inert, non-oxygen environment. For a coating formed from this formulation, tensile strength increased from a value of 1200 PSI (84.37 Kg per cm$^2$) for the prior art coating to 2050 PSI (144.13 Kg per cm$^2$). Similarly, elongation was increased from 80 to 90 percent. Hardness, as measured with a standard bench type Shore A Hardness Tester improved from 80 to 90.

A coating formed with this formulation was immersed in a mixture of boiling water and engine coolant for 70 hours. The coating was also immersed in three separate baths containing either automatic transmission fluid or one of two different automotive oils. Each of the oil baths was heated to 300° F. (149° C.). The coating was immersed in each oil bath for 70 hours. Throughout the immersions, chemical integrity and substrate adhesion were maintained.

EXAMPLE 2

| Component | Parts by Weight | Weight Percent |
| --- | --- | --- |
| Aromatic Urethane Acrylic Oligomer | 80.00 | 50.24 |
| Epoxyl Nitrile Acrylic Oligomer | 20.00 | 12.56 |
| Isobornyl Acrylate Monomer | 48.00 | 30.14 |
| Octyl Decyl Acrylate Monomer | 2.60 | 1.68 |
| Alpha, Alpha-Dimethoxy-Alpha-Phenylacetophenone | 6.67 | 4.18 |
| Polydimethylsiloxane | 1.33 | 0.84 |
| Iron Oxide Magnetite | 0.05 | 0.03 |
| Iron (III) Oxide | 0.53 | 0.33 |
| | 159.25 | 100.00 |

The composition of Example 2 was cured by exposure to an ultraviolet lamp having a nominal wavelength of 425 nanometers and a wavelength range between 385 and 460 nanometers for 0.75 second followed by exposure to a second lamp having a nominal wavelength of 375 nanometers and a wavelength range between 385 and 460 nanometers for 0.75 second. For a coating formed from this formulation, tensile strength decreased from a value of 1200 PSI (84.37 Kg per cm$^2$) for the prior art coating to 1075 PSI (75.58 Kg per cm$^2$). However, elongation was increased from 80 to 120 percent. Hardness, as measured with a standard bench type Shore A Hardness Tester remained at a value of 80.

A coating formed with this formulation was immersed in a mixture of boiling water and engine coolant for 70 hours. Throughout the immersions, chemical integrity and substrate adhesion were maintained.

EXAMPLE 3

| Component | Parts by Weight | Weight Percent |
| --- | --- | --- |
| Aromatic Urethane Acrylic Oligomer | 86.67 | 54.42 |
| Aliphatic Urethane Acrylic Oligomer | 13.33 | 8.37 |
| Isobornyl Acrylate Monomer | 47.99 | 30.14 |
| 2-Phenoxyethyl Acrylate Monomer | 2.67 | 1.68 |
| Alpha, Alpha-Dimethoxy-Alpha-Phenylacetophenone | 6.67 | 4.19 |
| Polydimethylsiloxane | 1.33 | 0.84 |
| Iron Oxide Magnetite | 0.05 | 0.03 |
| Iron (III) Oxide | 0.53 | 0.33 |
| | 159.24 | 100.00 |

The composition of Example 3 was cured by exposure to an ultraviolet lamp having a nominal wavelength of 425 nanometers and a wavelength range between 385 and 460 nanometers for 0.75 second followed by exposure to a second lamp having a nominal wavelength of 375 nanometers and a wavelength range between 340 and 410 nanometers for 0.75 second. For a coating formed from this formation, tensile strength increased from a value of 1200 PSI (84.37 Kg per cm$^2$) for the prior art coating to 1600 PSI (112.49 Kg per cm$^2$). Similarly, elongation was increased from 80 to 118 percent. Hardness, as measured with a standard bench type Shore A Hardness Tester improved from 80 to 86.

A coating formed with this formulation was immersed in a mixture of boiling water and engine coolant for 70 hours. Throughout the immersions, chemical integrity and substrate adhesion were maintained.

EXAMPLE 4

| Component | Parts by Weight | Weight Percent |
|---|---|---|
| Aromatic Urethane Acrylic Oligomer | 54.55 | 37.17 |
| Aliphatic Urethane Acrylic Oligomer | 18.18 | 12.39 |
| Nitrile Acrylic Oligomer | 27.27 | 18.58 |
| Isobornyl Acrylate Monomer | 40.91 | 27.87 |
| Alpha, Alpha-Dimethoxy-Alpha-Phenylacetophenone | 4.55 | 3.10 |
| Polydimethylsiloxane | 0.91 | 0.62 |
| Iron Oxide Magnetite | 0.04 | 0.02 |
| Iron (III) Oxide | 0.36 | 0.25 |
| | 146.77 | 100.00 |

The composition of Example 4 was cured by exposure to an ultraviolet lamp having a nominal wavelength of 425 nanometers and a wavelength range between 385 and 460 nanometers for 0.75 second followed by exposure to a second lamp having a nominal wavelength of 375 nanometers for and a wavelength range between 340 and 410 nanometers 0.75 second. For a coating formed from this formulation, tensile strength decreased from a value of 1200 PSI (84.37 Kg per cm$^2$) for the prior art coating to 1100 PSI (77.34 Kg per cm$^2$). However, elongation was increased from 80 to 151 percent. Hardness, as measured with a standard bench type Shore A Hardness Tester improved from 80 to 84.

A coating formed with this formulation was immersed in a mixture of boiling water and engine coolant for 70 hours. Throughout the immersions, chemical integrity and substrate adhesion were maintained.

EXAMPLE 5

| Component | Parts by Weight | Weight Percent |
|---|---|---|
| Aromatic Urethane Acrylic Oligomer | 100.0 | 61.54 |
| Isobornyl Acrylate Monomer | 47.56 | 29.27 |
| Trimethylolpropane Ethoxy Triacrylate Monomer | 3.11 | 1.91 |
| 1-Phenyl-2-Hydroxy-2-Methyl-1-Propanone | 7.41 | 4.56 |
| Benzophenone | 1.85 | 1.14 |
| Polydimethylsiloxane | 2.00 | 1.23 |
| Iron Oxide Magnetite | 0.05 | 0.03 |
| Iron (III) Oxide | 0.52 | 0.32 |
| | 162.50 | 100.00 |

The composition of Example 5 was cured by exposure to an ultraviolet lamp having a nominal wavelength of 375 nanometers and a wavelength range between 340 and 410 nanometers for one second followed by exposure to a second lamp having a nominal wavelength of 225 nanometers and a wavelength range between 210 and 280 nanometers for one second. For a coating formed from this formulation, tensile strength increased from a value of 1200 PSI (84.37 Kg per cm$^2$) for the prior art coating to 2100 PSI (147.64 Kg per cm$^2$). Elongation was increased from 80 to 105 percent. Hardness, with a standard bench type Shore A Hardness Tester improved from 80 to 84. The composition of Example 5 is the preferred composition for gaskets for automotive applications.

A coating formed with this formulation was immersed in a mixture of boiling water and engine coolant liquid for 70 hours. The coating was also immersed in three separate baths containing either automatic transmission fluid or one of two different automotive oils. Each of the oil baths was heated to 300° F. (149° C.). The coating was immersed in each oil bath for 70 hours. Throughout the immersions, chemical integrity and substrate adhesion were maintained.

As mentioned above, the initiating agent for polymerization of the coating is short-wave radiation such as ultraviolet light. The mixture is cured following application to the gasket body 11 by exposure to ultraviolet radiation. While ultraviolet curing is well known in the art, the present formulation requires a continuous two step in-line process. The process involves successive in-line exposure of the coated gasket to two ultraviolet lamps having different nominal radiant wavelengths. The exposure to the first lamp is followed immediately by exposure to the second lamp. The process cures pigmented coatings having a greater thickness than possible with previous ultraviolet curing methods.

The process consists of four steps, beginning with forming of the gasket body 11. Often this is accomplished by stamping the body 11 from a suitable sheet of material. The coating is then applied to the gasket body in a second step.

The coated gasket body 11 is exposed to a first source of ultraviolet radiation in the third step. The source is an ultraviolet lamp. A lamp having a power rating in the range of 375 to 600 watts per linear inch (148 to 236 watts per linear cm) has been successfully used in curing the coating. For the preferred formulation of Example 5, a type "D" bulb manufactured by Fusion UV Curing Systems of Rockville, Md. was used as the first ultraviolet source. This bulb radiates at a frequency having a nominal wavelength of 375 nanometers and cures the inner portions of the preferred formulation and causes the coating to adhere to the gasket body 11. It has been found that a type "V" bulb from Fusion UV Curing Systems having a nominal radiation wavelength of 425 nanometers also may be satisfactory for the first curing step, depending upon the specific formulation being cured.

The coated gasket 10 is immediately exposed to a second, shorter wavelength source of ultraviolet radiation in the final step of the process. For the preferred formulation, the second ultraviolet source was a type "H+" bulb manufactured by Fusion UV Curing Systems. This bulb radiates at a higher frequency than the first source and has a nominal wavelength of 225 nanometers and cures the surface portions of the preferred formulation. A fusion "H" bulb radiating at a frequency of 250 nanometers can also be used. It has been found that the Fusion "D" bulb having a nominal wavelength of 375 nanometers may be satisfactory for the second curing step, depending upon the specific formulation being cured. As with the first source, a power rating in the range of 375 to 600 watts per linear inch (148 to 236 watts per linear cm) is preferred.

The gaskets are usually moved past the ultraviolet lamps on a conveyor. The length of exposure is controlled by conveyor speed, which is typically in the range of 20 to 40 feet per minute (6.1 to 12.2 meters per minute). These conveyor speeds provide exposure times in the range of 0.5 to one second for each lamp. For the preferred formulation, a conveyor speed-of 20 feet per minute (6.10 meters per minute) and a curing time of one second for each lamp was used.

The ultraviolet sources do not need to be heated prior to use as with prior art curing ovens. Thus, energy is required only during the actual curing process. This results in energy savings during manufacture of the gaskets. While the above described curing process produces a satisfactory coating, the coating is further enhanced if the curing takes place in an inert nitrogen atmosphere. A flow rate of 20 cubic feet per minute (0.57 cubic meters per minute) of nitrogen through the curing equipment has been found to produce a better surface cure.

The improved curing process described above allows curing of pigmented coatings. Coatings having thickness between 0.001 inches (0.0025 cm) and 0.020 inches (0.050 cm) have been successfully cured with ultraviolet light. This is significantly thicker than possible with ultraviolet curing of similar prior art pigmented coatings.

In accordance with the provisions of the patent statutes, the principle and mode of operation of this invention have been explained and illustrated in its preferred embodiment. However, it must be understood that this invention may be practiced otherwise than as illustrated without departing from its spirit or scope.

What is claimed is:

1. A process for curing a gasket coating comprising the steps of:
   (a) providing a gasket body;
   (b) applying a resilient coating to said gasket body, said coating polymerizing in response to ultraviolet light;
   (c) exposing said coating and said body to ultraviolet radiation having a first wavelength to initiate polymerization of a first portion of said coating; and
   (d) exposing said coating and said body to ultraviolet radiation having a second wavelength different from said first wavelength to initiate polymerization of a different portion of said coating.

2. The process defined in claim 1 wherein said first ultraviolet radiation has a wavelength between 340 and 410 nanometers and said second ultraviolet radiation has a wavelength between 210 and 280 nanometers.

3. The process defined in claim 1 wherein said first ultraviolet radiation has a wavelength between 385 and 460 nanometers and said second ultraviolet radiation has a wavelength between 340 and 410 nanometers.

4. The process defined in claim 1 wherein step (c) includes exposure to said first wavelength radiation for from 0.5 to 2.0 seconds.

5. The process defined in claim 1 wherein step (d) includes exposure to said second wavelength radiation for from 0.5 to 1.0 seconds.

6. The process defined in claim 1 wherein the exposure to said second wavelength radiation occurs immediately after the exposure to said first wavelength radiation.

7. The process defined in claim 1 wherein the exposure to said first and second wavelength radiations occurs in a nitrogen atmosphere.

8. The process defined in claim 1 wherein said first portion of said coating is adjacent said gasket body and wherein said second portion of said coating is adjacent a surface of said coating.

9. The process defined in claim 1 wherein said first ultraviolet radiation has a wavelength that is higher than the wavelength of said second ultraviolet radiation.

* * * * *